July 21, 1942.  R. M. BUFFINGTON  2,290,532
REFRIGERATION
Filed Dec. 12, 1938   2 Sheets-Sheet 1

INVENTOR.
Ralph M. Buffington
BY
D. E. Heath
ATTORNEY.

Patented July 21, 1942

2,290,532

UNITED STATES PATENT OFFICE 2,290,532

REFRIGERATION

Ralph M. Buffington, Evansville, Ind., assignor to Servel, Inc., New York, N. Y., a corporation of Delaware Application December 12, 1938, Serial No. 245,098

11 Claims. (Cl. 62—119.5)

My invention relates to refrigeration and it is an object of the invention to extend the field of usefulness of carbon dioxide as a refrigerant fluid.

Figure 1:
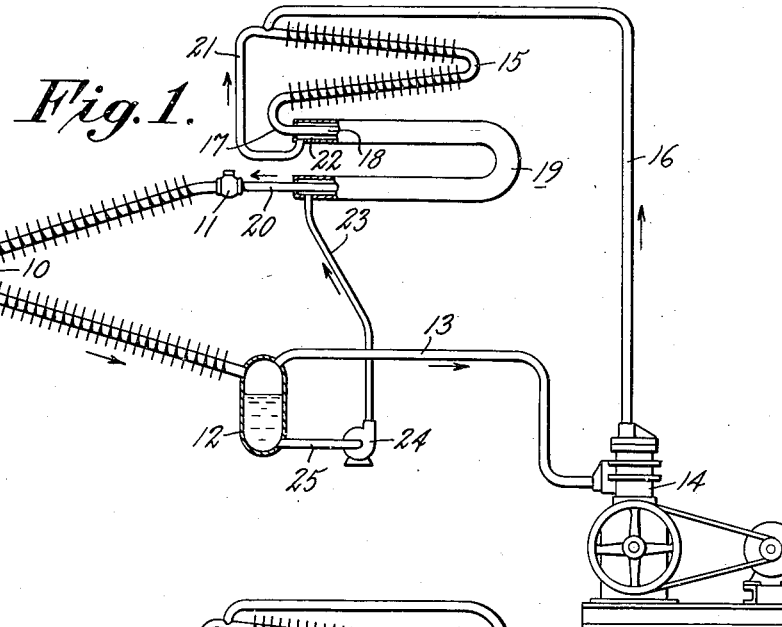
Figure 2:
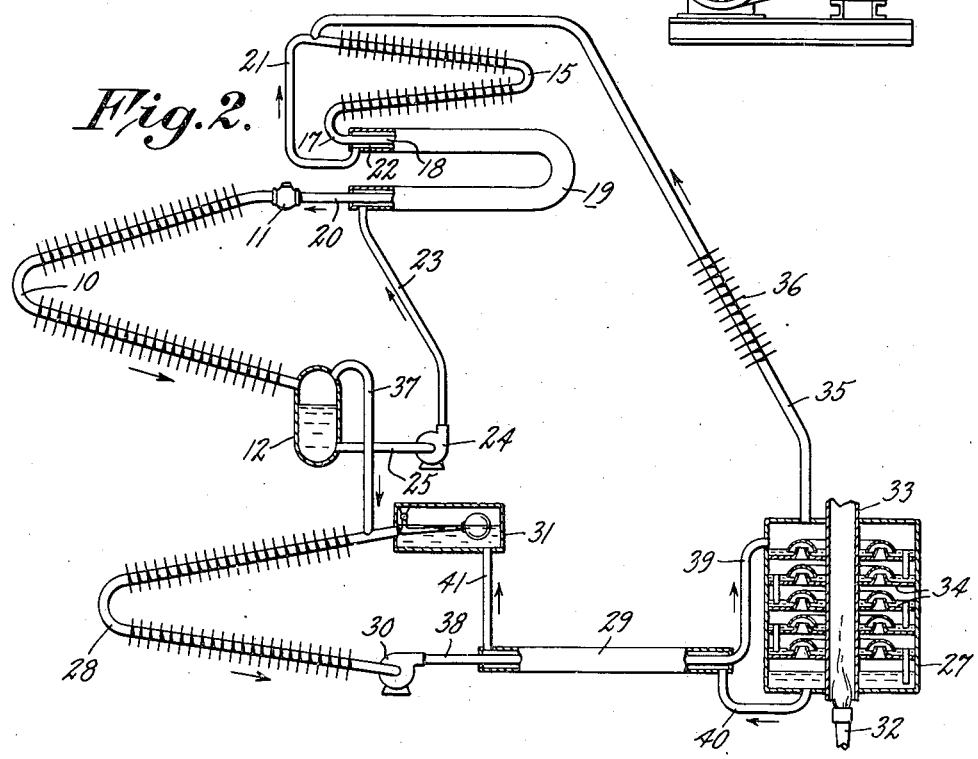
Figure 3:
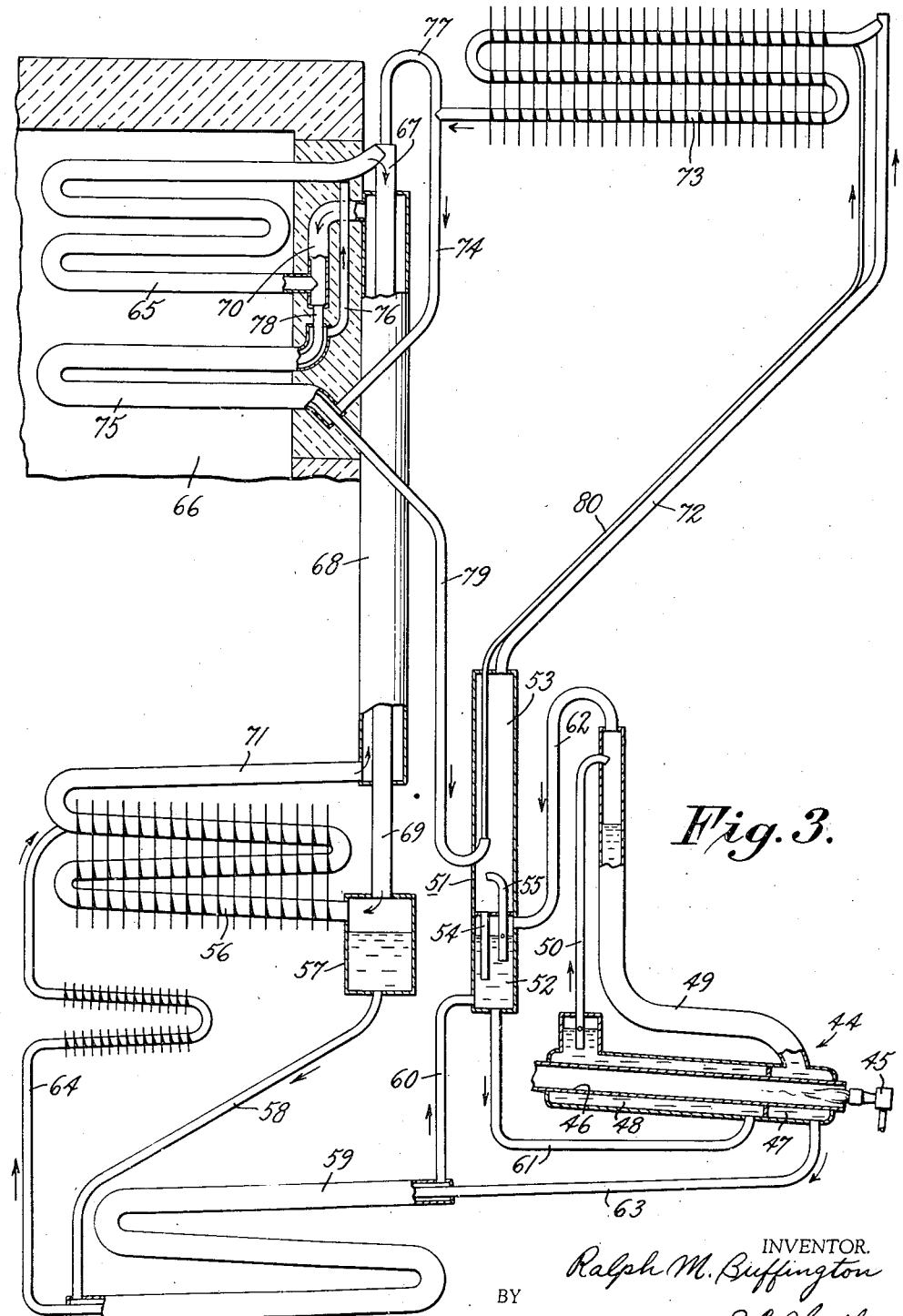

I utilize carbon dioxide as a refrigerant by reducing the vapor pressure of the pure liquid fluid by dissolving it in a suitable solvent, evaporating the fluid from solution to produce refrigeration, and condensing the fluid by absorption in the solvent. The invention will be more fully understood upon reference to the following description in connection with the accompanying drawings in which Fig. 1 shows more or less diagrammatically a compression type refrigeration system embodying the invention; Fig. 2 shows more or less diagrammatically a two-pressure absorption type refrigeration system embodying the invention; and Fig. 3 shows more or less diagrammatically a uniform pressure type absorption refrigeration system embodying the invention.

Referring to Fig. 1, an evaporator 10 is shown as a finned pipe coil. The upper end of evaporator 10 is connected to an expansion valve 11. The lower end of evaporator 10 is connected to the upper part of a vessel 12. The upper part of vessel 12 is connected by a conduit 13 to the suction inlet of a motor driven compressor 14. A condenser 15 is shown as a finned pipe coil. The upper end of condenser 15 is connected by a conduit 16 to the discharge side of compressor 14. The lower end of condenser 15 is connected by a conduit 17, the inner passage 18 of a liquid heat exchanger 19 and a conduit 20 to the expansion valve 11. The upper end of condenser 15 is also connected by a conduit 21, the outer passage 22 of liquid heat exchanger 19, a conduit 23, a liquid pump 24, and a conduit 25 to the lower part of vessel 12.

The above described apparatus is evacuated and charged with a refrigerant fluid and a liquid absorbent therefor. Because it plays a part in normal body processes carbon dioxide is a relatively safe fluid for use in refrigeration, particularly in connection with air conditioning for comfort. I therefore use carbon dioxide as the refrigerant fluid in this system. Carbon dioxide has a high vapor pressure and its critical temperature is low (87.8° F.). To lower the pressure, say, to one-half or one-third, and to carry out condensation of the carbon dioxide, I provide one of a class of solvents for carbon dioxide. A solvent in this class must be such that the carbon dioxide may be expelled from solution therewith by a moderate increase in temperature; that no solid phase be precipitated at any point in the cycle of operation; that it be a stable, non-corrosive liquid; that it is preferably non-volatile under the conditions of operation; and that the carbon dioxide is highly soluble therein. Examples of suitable absorbents in this class are mono-, di-, and tri-ethanolamine; mixtures of these with water; and diamino isopropanol. All of these absorbents are both amines and alcohols, being later herein referred to as amino-alcohols, and have the typical properties of such compounds. They are low freezing, high boiling, alkaline compounds, and are soluble in water, alcohol, and other polar solvents. They are strongly enough alkaline to absorb carbon dioxide, and not too strongly alkaline to permit easy regeneration of the carbon dioxide. In the above system, I therefore use, for example, diamino isopropanol as solvent.

In operation of the system, the compressor 14 withdraws carbon dioxide gas from the evaporator vessel 12 through conduit 13. The pump 24 withdraws liquid from vessel 12 through conduit 25. The pump causes the withdrawn liquid to flow through conduit 23, liquid heat exchanger 19 and conduit 21 into the condenser 15. The compressor 14 compresses the withdrawn carbon dioxide and discharges the compressed gas through conduit 16 into condenser 15. The compressed carbon dioxide dissolves in the liquid in condenser 15 and may therefore be liquefied at a temperature above the critical temperature of carbon dioxide. The resulting strong solution of carbon dioxide in diamino-isopropanol flows from the condenser 15 through conduit 17, liquid heat exchanger 19, conduit 20, and expansion valve 11 into evaporator 10. The carbon dioxide evaporates from solution in the evaporator 10 and is withdrawn through vessel 12 and conduit 13 by the compressor. The resulting weak solution accumulates in vessel 12 from which it is withdrawn by the pump 24 through conduit 25.

In Fig. 2 there is shown more or less diagrammatically a two pressure absorption type refrigeration system embodying the invention. There are parts of this system which are identical with that described in connection with Fig. 1 and like parts in Figs. 1 and 2 are indicated by the same reference numerals. In Fig. 2 there is, in place of a compressor, a liquid circuit including a generator 27, an absorber 28, a liquid heat exchanger 29, a liquid pump 30, and a float valve 31. The generator 27 is heated by a burner 32 arranged so that the flame is projected into a flue 33 which extends upward through the generator. Within the generator 27 are a series of bubble trays 34 so that vapor rising in the generator bubbles through descending liquid in the trays. The upper part of generator 27 is connected by a conduit 35 to the upper end of condenser 15. Conduit 35 is provided with a finned section 36 which serves as a rectifier.

The upper end of absorber 28 is connected to float valve 31. The upper end of absorber 28 is also connected by a conduit 37 to the upper part of evaporator vessel 12. The lower end of absorber 28 is connected to pump 30. The discharge side of pump 30 is connected by a conduit 38, inner passage of liquid heat exchanger 29, and conduit 39 to the upper part of generator 27. The bottom of generator 27 is connected by a conduit 40, outer passage of liquid heat exchanger 29, and conduit 41 to the float valve 31.

This system is also charged with carbon dioxide and diamino-isopropanol. In operation of the system, burner 32 heats generator 27; pump 24 pumps weak solution from evaporator 12 through liquid heat exchanger 19 into condenser 15, as described in connection with Fig. 1; and pump 30 pumps strong solution from absorber 28 through conduit 38, liquid heat exchanger 29, and conduit 39 into the upper part of generator 27. Strong solution flows downward in generator 27 over the trays 34 to the bottom of the generator from where it flows through conduit 40, liquid heat exchanger 29, and conduit 41 to the float valve 31. In the generator 27 carbon dioxide is expelled from solution and flows through conduit 35 to condenser 15.

Carbon dioxide is dissolved in condenser 15 and the solution flows through conduit 17, liquid heat exchanger 19, conduit 20, and expansion valve 11 into evaporator 10. Carbon dioxide evaporates from solution in evaporator 10, producing a refrigerating effect. Carbon dioxide flows from the evaporator vessel 12 through conduit 37 to absorber 28. Float valve 31 admits weak solution into the upper end of absorber 28. Carbon dioxide is absorbed into the weaker solution in absorber 28, and the resulting enriched solution is returned to the generator by pump 30 as previously described.

Referring to Fig. 3, there is shown an absorption type refrigeration system containing a pressure equalizing inert auxiliary fluid, such as hydrogen, and utilizing carbon dioxide as refrigerant and diamino isopropanol as absorbent. A generator 44 is heated by a burner 45, arranged so that the flame projects into a heating flue 46. The flue extends through chambers 47 and 48. The lower end of a standpipe 49 is connected to chamber 47. A vapor liquid lift conduit 50 extends from within chamber 48 upward to the upper part of standpipe 49.

An analyzer 51 has a lower chamber 52 and an upper chamber 53. There is a drain conduit 54 from the upper chamber to the lower chamber, and a small vapor lift conduit 55 from the lower chamber 52 to upper chamber 53. For further description of this type of analyzer reference may be had to application Serial No. 71,989 of Harry K. Bergholm, filed April 1, 1936, Patent No. 2,169,214.

An absorber 56 comprises a finned pipe coil and a vessel 57 connected to the lower end of the pipe coil. The lower part of vessel 57 is connected by a conduit 58, outer passage of a liquid heat exchanger 59, and a conduit 60 to the analyzer chamber 52. Chamber 52 is connected by a conduit 61 to generator chamber 48. The upper part of chamber 52 is connected by a conduit 62 to the upper end of generator standpipe 49. Generator chamber 47 is connected by a conduit 63, inner passage of liquid heat exchanger 59, and conduit 64 to the upper end of absorber 56. Conduit 64 is provided with a finned loop for air cooling.

An evaporator 65 is shown as a pipe coil located in a refrigerator storage compartment 66. The upper end of evaporator 65 is connected by a conduit 67, inner passage of a gas heat exchanger 68, and a conduit 69 to the upper part of absorber vessel 57. The lower end of evaporator 65 is connected by a conduit 70, outer passage of gas heat exchanger 68 and a conduit 71 to the upper end of absorber 56. The upper end of analyzer 51 is connected by a conduit 72 to the upper end of a condenser 73 shown as a finned pipe coil. The lower end of condenser 73 is connected by a conduit 74, outer passage of a heat exchanger 75, and a conduit 76 to the upper end of evaporator 65. The lower end of condenser 73 is also connected by an upward looped conduit 77 to the upper end of conduit 67.

The lower end of evaporator 65 is connected by conduit 70, a conduit 78, inner passage of heat exchanger 75, a conduit 79 and a conduit 80 to the upper end of condenser 73. Conduit 80 is a relatively small conduit to act as a vapor liquid lift. The lower end of conduit 80 is arranged in thermal exchange relation with analyzer 51 and the upward extending part of conduit 80 is arranged in thermal exchange relation with conduit 72. The lower end of conduit 80 is connected to conduit 79 and together these conduits form a downward loop.

Heat is applied to the generator 44 by burner 45 and carbon dioxide is expelled from solution in both chambers 47 and 48. Gas in chamber 48 causes liquid to rise in known manner through conduit 50 into the upper part of standpipe 49. Absorption liquid flows downward in standpipe 49 into chamber 47 and flows through conduit 63, heat exchanger 59, and conduit 64 into the upper end of evaporator 56. Liquid flows downward through evaporator 56 into vessel 57 and thence flows through conduit 58, liquid heat exchanger 59, conduit 60, analyzer 51, and conduit 61 to generator chamber 48. Gas flows from the upper end of standpipe 49 through conduit 62, analyzer 51 and conduit 72 to condenser 73. Liquid also enters the upper end of condenser 73 through conduit 80. The carbon dioxide is condensed into solution in liquid in the condenser and flows from the lower end of the condenser through conduit 74, liquid heat exchanger 75, and conduit 76 into the upper end of the evaporator 65.

Carbon dioxide evaporates from solution in evaporator 65. The gas flows from the upper end of the evaporator through conduit 67, gas heat exchanger 68 and conduit 69 to the absorber 56. The weakened absorption liquid flows from the lower end of the evaporator through conduit 78, heat exchanger 75, conduit 79, and conduit 80 back to the condenser. The upward flow of liquid in conduit 80 is caused by thermosyphonic or vapor lift action. Liquid is heated in conduit 80 by heat transfer from generator gas in analyzer 51 and conduit 72, causing expulsion of gas out of solution. The gas lightens the column of liquid in conduit 80 so that liquid rises to the upper end of conduit 80 and overflows into the condenser.

In the absorber 56, carbon dioxide is absorbed in the descending stream of liquid. The resulting weak gas flows from the upper end of the absorber through conduit 71, gas heat exchanger 68, and conduit 70 back to the evaporator.

What is claimed is:

1. A method of refrigeration which includes condensing and evaporating carbon dioxide in the presence of diamino isopropanol.

2. A method of refrigeration which includes condensation and evaporation of carbon dioxide in the presence of a compound of the group consisting of primary, secondary and tertiary ethanolamines.

3. A method of refrigeration which includes condensation and evaporation of carbon dioxide in the presence of a solvent therefor which is an amino-alcohol.

4. A method of refrigeration which includes evaporation of carbon dioxide from solution in an amino-alcohol, absorption of carbon dioxide into solution in said absorbent, expulsion of the absorbed carbon dioxide from solution, and reabsorption of expelled carbon dioxide.

5. A method of refrigeration which includes evaporating carbon dioxide from solution in an amino-alcohol, withdrawing the evaporated carbon dioxide, condensing the withdrawn carbon dioxide by dissolving in said solvent, and again evaporating the dissolved carbon dioxide.

6. A refrigeration system including a condenser, an evaporator, conduits including a liquid heat exchanger forming with said condenser and evaporator a circuit for circulation of a liquid amino-alcohol through and between said condenser and evaporator, means utilizing waste heat from the system for causing continuous circulation of said liquid in said circuit, means for supplying carbon dioxide gas to said condenser, and means for withdrawing carbon dioxide gas from said evaporator.

7. A refrigeration system as set forth in claim 6 in which said means for supplying carbon dioxide to said condenser is a generator, and said means for withdrawing carbon dioxide from said evaporator is an absorber.

8. A refrigeration system including a condenser, an evaporator, conduits connecting said condenser and evaporator forming therewith a circuit for circulation of a liquid amino-alcohol therethrough and therebetween, means for supplying carbon dioxide to said condenser, means for withdrawing carbon dioxide from said evaporator, and means operable by waste heat from the system for causing circulation of liquid in said circuit by gas lift action.

9. A method of refrigeration which includes supplying gaseous carbon dioxide under pressure, condensing said gaseous carbon dioxide in the presence of an amino-alcohol, reducing the pressure of the carbon dioxide and amino-alcohol, evaporating the carbon dioxide at the reduced pressure, separating the evaporated carbon dioxide from the amino-alcohol, increasing the pressure of the carbon dioxide, and again supplying the carbon dioxide under pressure.

10. A method of refrigeration which includes heating a solution of carbon dioxide dissolved in an absorption liquid to produce gaseous carbon dioxide under pressure, condensing said gaseous carbon dioxide in the presence of an amino-alcohol, reducing the pressure of the carbon dioxide and amino-alcohol, evaporating the carbon dioxide at the reduced pressure, separating the evaporated carbon dioxide from the amino-alcohol, absorbing the carbon dioxide in the absorption liquid, increasing the pressure of the solution of carbon dioxide in absorption liquid, and again heating said solution.

11. A method of refrigeration which includes heating a solution of carbon dioxide dissolved in an absorption liquid to produce gaseous carbon dioxide under pressure, condensing said gaseous carbon dioxide in the presence of an amino-alcohol, reducing the partial pressure of carbon dioxide by mixture with an inert gas, evaporating the carbon dioxide at the reduced partial pressure, separating the gaseous mixture of carbon dioxide and inert gas from the amino-alcohol, absorbing the carbon dioxide in the absorption liquid to thereby release the inert gas from the mixture, and again heating said solution.

RALPH M. BUFFINGTON.